June 12, 1962  T. R. HENRY ET AL  3,038,331
APPARATUS FOR MEASURING REACTION ENGINE THRUST
Filed June 10, 1958  3 Sheets-Sheet 1

INVENTORS
THOMAS R. HENRY
FRANK J. SORIERO, Jr.
BY Raymond P. Wallace
AGENT

United States Patent Office 3,038,331
Patented June 12, 1962

3,038,331
APPARATUS FOR MEASURING REACTION
ENGINE THRUST
Thomas R. Henry, Emporium, and Frank J. Soriero, Jr., Philipsburg, Pa., assignors to Curtiss-Wright Corporation, a corporation of Delaware
Filed June 10, 1958, Ser. No. 741,142
2 Claims. (Cl. 73—116)

This invention relates to apparatus for measuring the thrust of jet engines, turbo-jets, rockets, or other forms of reaction motors, and more particularly to apparatus for mounting such a motor during the test procedure.

It is an object of this invention to provide resilient mounting means for a reaction motor.

It is another object to provide resilient mounting means which remains in tension during test operation of a reaction motor.

It is a further object of the present invention to provide motor mounting means which permits only translational movement parallel to the longitudinal axis of the motor.

A still further object is to provide a motor mounting whereby angular movement of the motor is obviated.

Yet another object is to provide a testing apparatus by which the full thrust of a reaction motor may be measured.

Other objects and advantages will become apparent on reading the following specification, taken in conjunction with the drawings, of which FIGURE 1 is a perspective view showing a standard method of mounting a reaction motor during measurement of thrust;

Figure 1:
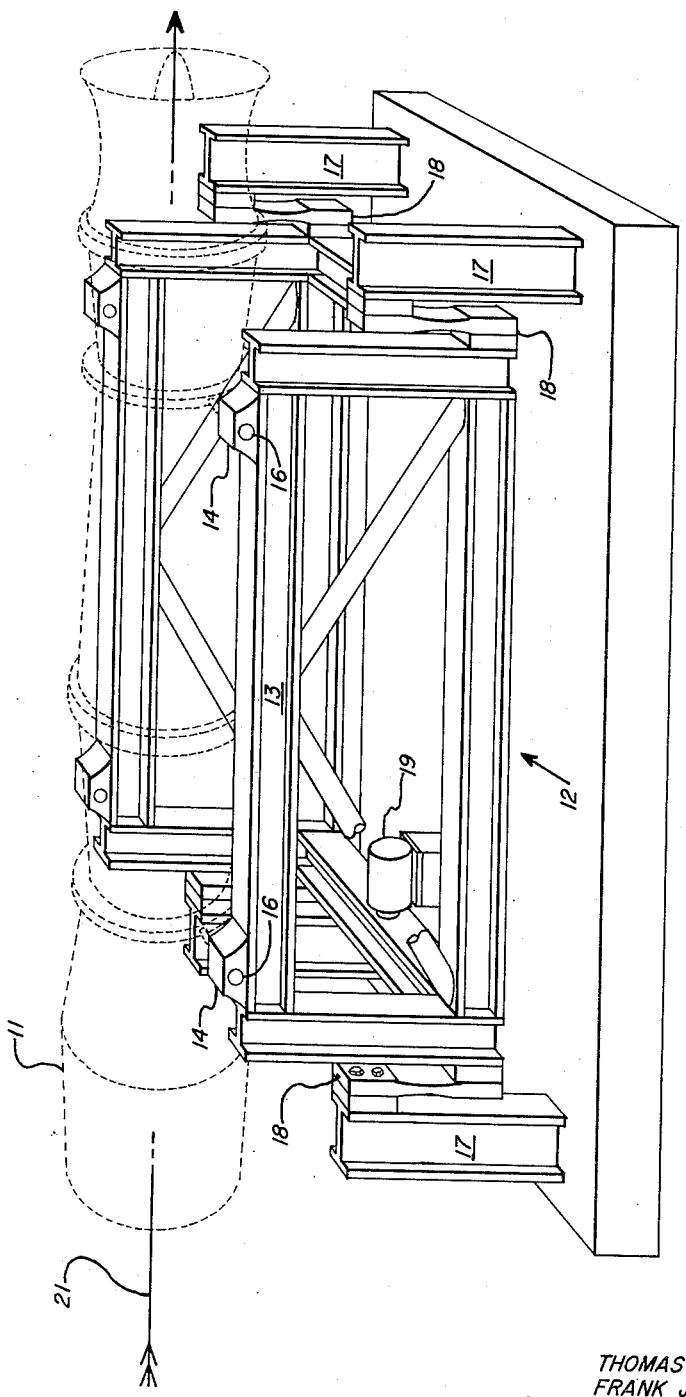

Referring more particularly to FIGURE 1, there is shown the testing set-up as now known and practiced. A reaction motor, for example a jet engine 11, is mounted on a standard test stand, indicated generally at 12. A carriage framework 13 bears pillowblocks 14 which support the engine on trunnions 16 extending laterally therefrom. Vertical posts 17 bear four standard flexure plates 18 bolted or otherwise suitably secured thereto, with the lower ends of the plates free-swinging and secured to the lower portion of carriage 13.

Flexure plates 18 are rectangular bars of steel or other metal of sufficient tensile strength, having their center sections reduced in thickness between the attachment points in such a manner as to permit relatively easy flexure in the direction in which the plate is thinnest. When carriage 13 is mounted on the lower ends of the plates, with the thin sections thereof disposed transversely to the longitudinal axis of the carriage, the weight is supported by the plates in tension with the carriage free to move longitudinally to the extent of flexure.

When it is desired to measure the thrust of a reaction engine, the motor is mounted on the carriage as described above. The engine is then run on the test stand and the carriage is driven forward with a force correlated with the amount of thrust of the motor. The forward movement is only a small fraction of an inch, being restrained by a standard load cell 19 bearing against some convenient portion of the carriage, which measures the thrust of the motor. However, since the engine is mounted well above the point of suspension of the carriage and the actual application of thrust is along the axis of the motor, indicated by the arrow 21, there is a strong tendency for the motor to exert a lever action on the carriage. Thus, the rear end tends to rise, placing the rear flexure plates under a compression load instead of tension, with resultant damage or destruction of the plates, which are incapable of bearing the load except in tension. Also, when this situation occurs the carriage does not move in the forward direction to the extent required to measure the full thrust.

Figure 2:
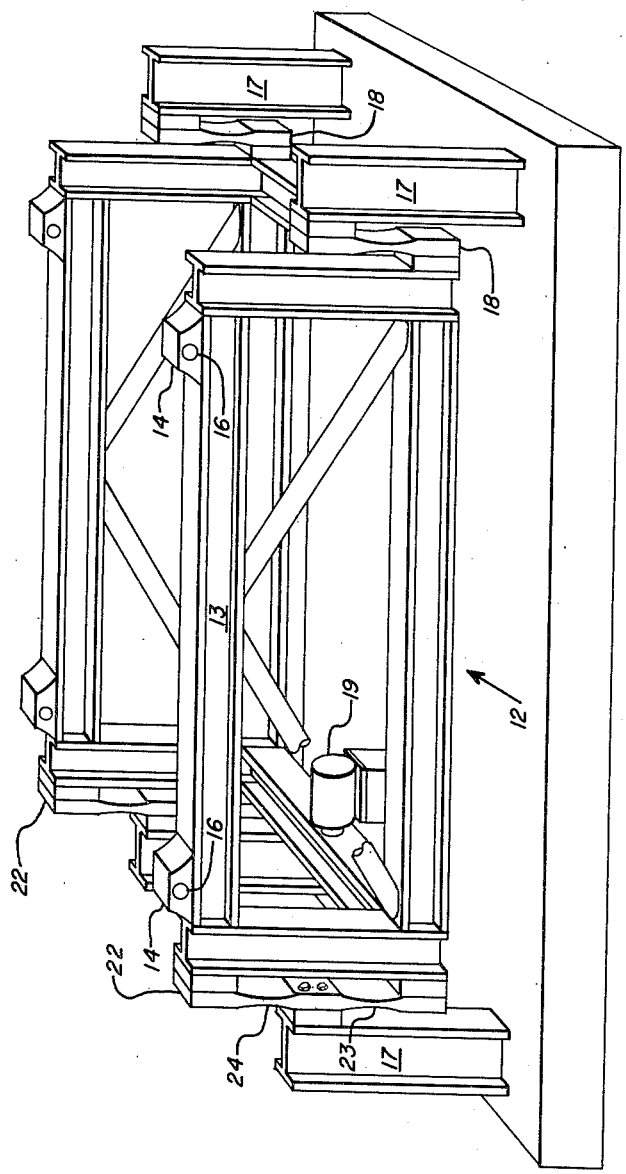
FIGURE 2 is a similar view showing the method of mounting according to the present invention.

The present invention corrects this defect by the use of a pair of double flexure plates 22 to suspend the rear end of the carriage, as shown in FIGURE 2. The center portion of plates 22 is firmly secured to posts 17 by bolts or other suitable means. When the engine is not operating the carriage is suspended from front plates 18 and from the lower portion 23 of plates 22, plates 18 and portions 23 being in tension. Upper portion 24 of plate 22 is idle at this time, but when the engine is producing thrust any tendency to raise the rear end of the carriage immediately puts portion 24 in tension, and portion 23 becomes idle. It therefore becomes impossible to apply a compressive force to any flexure plate or any portion of a flexure plate, and the weight of the carriage and motor, and its propulsive thrust, are always supported in tension. If desired, both ends of the carriage may be suspended on double flexure plates.

Figure 3:
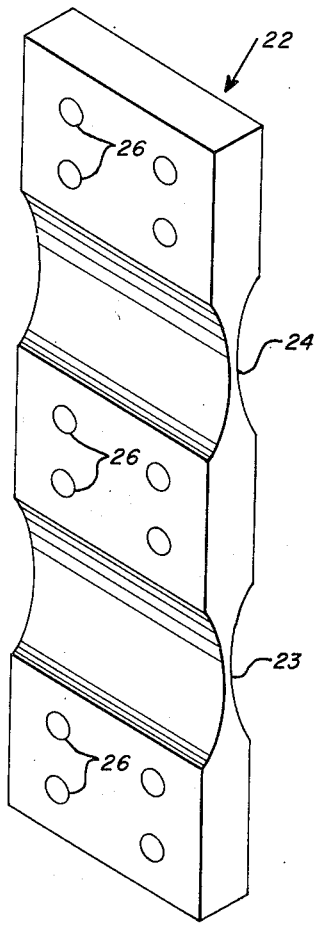
FIGURE 3 is a perspective view of the double flexure plate of the present invention.

Referring now to FIGURE 3, there is shown one of the double flexure plates 22, which is preferably made of steel but may be of any metal having suitable tensile strength and flexibility. A bar of metal is machined or otherwise provided with two plane, parallel sides. Midway between each end and the middle the thickness of the bar is greatly reduced. It has been found convenient to produce this reduction by grinding on a large radius from both sides, leaving the thin sections 23 and 24, but the metal may equally well be reduced by any desired method, such as machining, forging, or swaging. Flat surfaces are left on both sides at the ends and the middle, and are provided with holes 26 for attachment to the carriage and supporting posts. The dimensions of the plates may be made suitable to the application intended, except that sections 23 and 24 must be thin enough to provide adequate flexure. For this reason the plates are generally reduced to a thickness of approximately one-tenth inch at the thinnest point, that is, the bottom of the arc. Additional strength may be gained by making the plates wider.

It is important that the flexure points be always in the same place, and that their location be known. Therefore, the reduction in thickness is preferably made between two opposed arcs, with the flexure point between them at the bottom of the arcs. The loci of attachment of the flexure plates to the carriage and to the supports are considered to be transverse lines midway between the bolt holes in the center and between the bolt holes at each end, and each flexure point is located along a parallel transverse line midway between the end locus of attachment and the center locus. The double flexure plates may therefore be used either end up, and with either of the parallel sides facing in the forward direction. The single flexure plates 18 used at the opposite end of the carriage must be made to congruent proportions and dimensions, and at assembly of the test stand all plates are positioned at the same level by the use of surveying equipment, so that flexure of the plates allows movement of the carriage only in the horizontal direction parallel to the longitudinal axis of the carriage.

Figure 4:
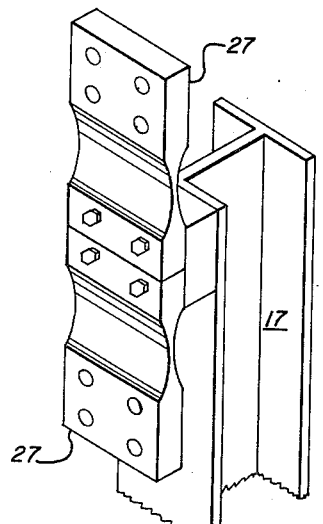
FIGURE 4 is a perspective view showing a method of mounting two single flexure plates to approximate a double flexure plate.

FIGURE 4 shows a manner of modifying and mounting two single plates to approximate a double plate. One end of each of two single plates 27 is cut off midway between the four mounting holes, and the two cut ends are butted together with the abutment serving as the center locus of attachment to post 17. This leaves only two mounting holes in each plate at the center, which will serve where the weight to be supported is not too great.

Figure 5:
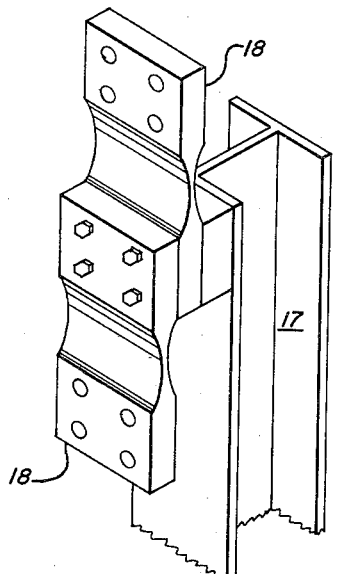
FIGURE 5 is a similar view of another method of mounting two single plates to approximate a double flexure plate.

FIGURE 5 shows another manner of mounting two single plates 18 to approximate a double plate. One end of each of two plates is overlapped and bolted to post 17, providing a center locus. Although this arrangement will serve, it is not so satisfactory as a double plate; movement at the end of a carriage supported in this manner may be somewhat distorted, since the two flexure points are not located on the same vertical plane.

Although this invention has been described above in detail in a preferred embodiment, it will be understood by those skilled in the art that various changes and modifications may be made without departing from the scope or spirit of the invention. It is intended to cover all such modifications in the appended claims.

What is claimed is:

1. A metal double flexure plate having length, width, and thickness, said length being at least twice said width and said thickness being less than said width; said plate having parallel plane surfaces across said width on opposed sides and disposed at each end and at the center of said plate; said plate having a locus of attachment at each end and at the center thereof; said plate having a pair of opposed arcuate concave surfaces between each of said ends and said center plane surfaces; said plate being reduced in thickness between each pair of said opposed arcuate surfaces; said plate being flexible across said width at each of said reductions midway between each of said end loci and said center locus; said plate being adapted to sustain tension between said center locus and each of said end loci.

2. In a thrust-measuring mechanism having a carriage suspended from supporting members and adapted to translational movement parallel to the direction of thrust and having a load cell for measuring said movement, the combination with said carriage of at least one pair of metal double flexure plates; each of said plates having length, width, and thickness, said length being at least twice said width and said thickness being less than said width; each of said plates having parallel plane surfaces across said width on opposed sides and disposed at each end and at the center of said plate; each of said plates having a locus of attachment at each end and at the center thereof; each of said plates having a pair of opposed arcuate concave surfaces between each of said ends and said center plane surfaces; each of said plates being reduced in thickness between each pair of said opposed arcuate surfaces; each of said plates being flexible across said width at each of said reductions midway between each of said end loci and said center locus; each of said plates being adapted to sustain tension between said center locus and each of said end loci; each of said plates being attached to one of said supporting members at said center locus and being attached to said carriage at each of said end loci and suspending said carriage from said supporting members with said lengths being vertically disposed and said widths being disposed transverse to the direction of said translational movement.

References Cited in the file of this patent

UNITED STATES PATENTS

| | | |
|---|---|---|
| 2,657,921 | MacBride | Nov. 3, 1953 |
| 2,753,176 | List | July 3, 1956 |
| 2,774,241 | Bennett | Dec. 18, 1956 |
| 2,941,398 | Pugnaire et al. | June 21, 1960 |

OTHER REFERENCES

Publication: Hunter-Bristol Corporation Advertising Bulletin—"Thrust Stands"—received in Patent Office August 19, 1957. (Copy in 73–116.)